July 9, 1963
S. PROLER ET AL
3,096,894
DUMP TRUCK
Filed June 27, 1961
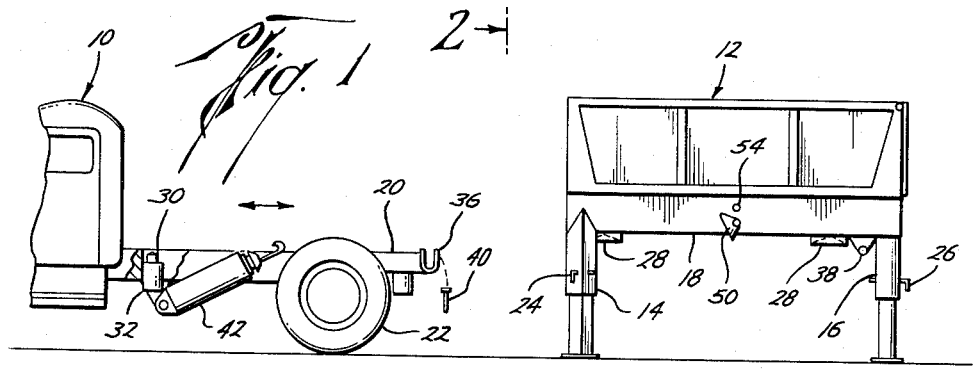
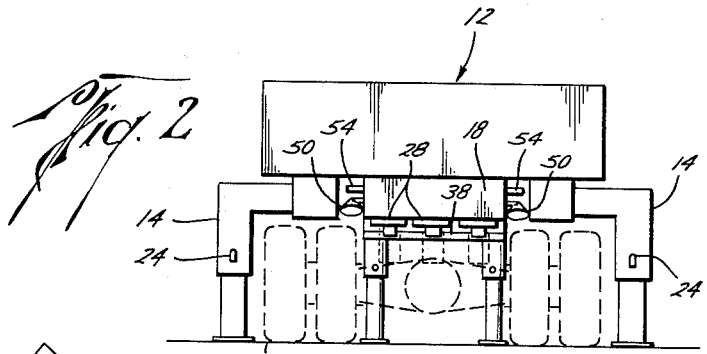
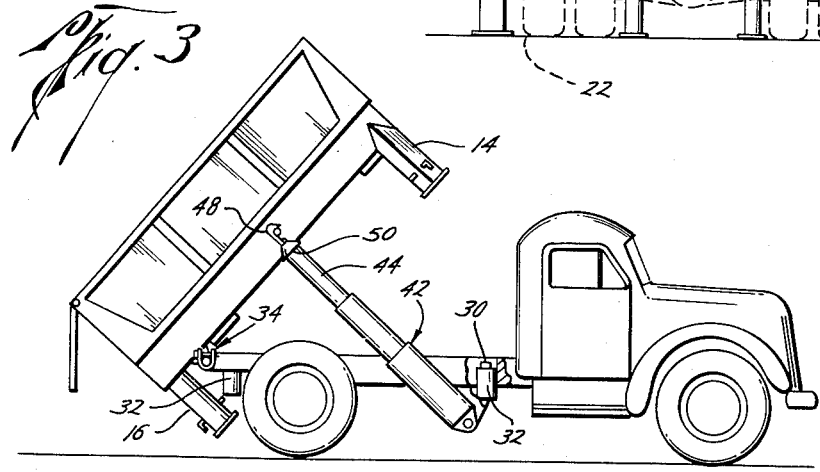
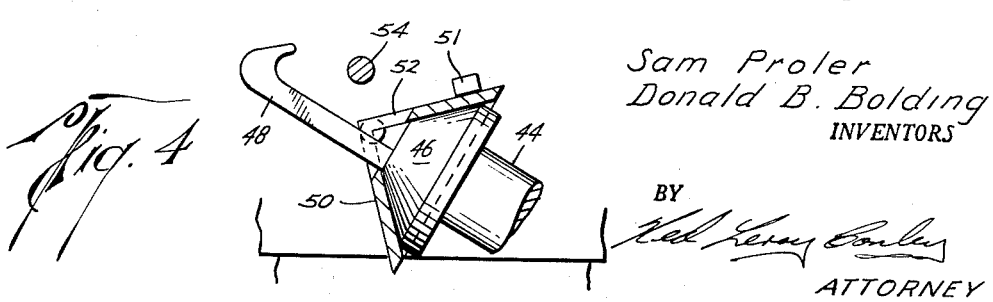
Sam Proler
Donald B. Bolding
INVENTORS
BY
ATTORNEY

United States Patent Office 3,096,894
Patented July 9, 1963

3,096,894
DUMP TRUCK
Sam Proler and Donald B. Bolding, Houston, Tex., assignors to Proleride Transport Systems, Inc., Houston, Tex., a corporation of Texas
Filed June 27, 1961, Ser. No. 119,886
8 Claims. (Cl. 214—515)

This invention relates to dump trucks, and more particularly it relates to dump trucks having a removable dump body. Certain features of the dump truck are described in considerable detail in copending application for patent Serial No. 101,224 filed April 6, 1961, and Serial No. 106,936 filed May 1, 1961, by Sam Proler and Herman J. Proler, both now abandoned, and in the continuation in part application Serial No. 119,900, filed concurrently herewith by Sam Proler and Herman J. Proler.

There has long been a need for a multi-purpose truck for use in handling a large variety of goods. For example contractors in the construction business must haul lumber, small items, personnel, sand, gravel, and many other things. For hauling lumber they need a stake body truck; for hauling sand and gravel they need a dump truck; for hauling other items a gondola body truck is required; and for still other items it is necessary to have an enclosed truck. This requires a very large investment in a number of different types of trucks required. Furthermore, the contractor is unable to use all these trucks full time since on certain days he may need to handle a large amount of sand and gravel, for example, while on other days he may have no material of this type but will have materials to handle which require other types of trucks. Thus a large number of his trucks are idle a great proportion of the time.

It is an object of this invention to provide means for converting a truck to several different uses by providing means by which the truck body may be removed and replaced by another type of body.

It is another object of this invention to provide a dump truck which has a removable dump body so that a supply of materials such as sand or gravel may be delivered to a construction site and be left in the body and used as needed instead of being dumped on the ground where a great deal is wasted.

It is another object of this invention to provide a unique dump truck construction which is peculiarly adapted to be converted to handle a large variety of goods.

For a better understanding of this invention reference is now made to the accompanying drawings wherein:

FIGURE 1 is an elevational view of one embodiment of the dump truck of this invention, with the dump body separated from the truck;

FIGURE 2 is a front view of the dump body taken at line 2—2 of FIGURE 1 showing the rear end of the truck thereunder in broken lines to show the relationship between the truck bed and the dump body;

FIGURE 3 is an elevational view of an embodiment of the dump truck of this invention showing the dump body mounted on the truck in dumping position; and FIGURE 4 is a detail sectional view of the means on the dump body which are engaged by the hydraulic dumping cylinder of the truck.

Referring first to FIGURE 1, the truck 10 is shown in position ready to back under the dump body 12. The dump body 12 is supported on a pair of front legs 14 and a pair of rear legs 16 at a height sufficient for the sub frame 18 of the body to clear the bed 20 of the truck. As shown in FIGURE 2 the spacing of front legs 14 is such as to permit the rear wheels 22 to pass therebetween. Front legs 14 are vertically extensible and retractable and may be locked in either the extended or retracted position by means of pins 24. The front legs are also horizontally retractable and may be retracted from the position shown in FIGURE 2 by sliding the legs inwardly horizontally towards the center of the dump body so that the legs are entirely within the width of the body. Rear legs 16 are vertically extensible and retractable and may be retained in either position by means of pins 26 but need not be extensible horizontally. These legs may be closer together since they do not need to clear the rear wheels of the truck.

On the under side of the subframe 18 of the dump body are positioned a plurality of centering caps 28 each of which comprises a downwardly facing conical concavity which is positioned to be engaged by a piston rod 30 of a fluid cylinder 32 mounted on the truck bed and extending upwardly therefrom. Piston rods 30 are conically formed on their upper ends for engagement with the centering caps 28.

The dump body is hingedly attached to the truck bed by means of a hinge 34 which comprises an upwardly open U-shaped member 36 extending across the back of the truck, a co-engageable laterally extending rod 38 extending across the back of the dump body, and a plurality of pins 40 which are adapted to be inserted through aligned openings (not shown) in the U-shaped member 36 when the rod 38 is positioned therein in the manner shown in FIGURE 3.

Novel dumping means are provided for the dump truck of this invention. This means includes a fluid cylinder 42 which preferably is of the double telescoping type as is shown in FIGURE 3 and which is pivotally mounted on the truck bed and extends rearwardly and upwardly therefrom. According to this invention the piston rod 44 of this fluid cylinder is formed in a conical shape 46 on its end and is provided with an axially extending hook 48. The cone 46 on the piston rod is engageable with a corresponding female cone 50 which is pivotally mounted on the subframe 18 of the dump body 12. A magnet 51 is attached to the dump body in such a position as to retain the female cone 50 in the proper position to be engaged by the piston rod 44 when it is extended from the fluid cylinder. Female cone 50 is slotted at its apex, the slot 52 providing for passage of the hook 48 therethrough. Just above the cone 50, mounted on the subframe of the dump body, a bar 54 extends laterally outwardly from the subframe for engagement by the hook 48. It will be apparent from a consideration of FIGURES 3 and 4 that when the dump body is resting on the truck bed the piston rod 44 of the fluid cylinder 42 may be extended into engagement with the cone 50 whereby the hook 48 extends through the slot 52. Then upon further extension of the piston rod from the fluid cylinder the dump body will be raised until it reaches dumping position. At this position the angular relationship between the piston rod and the dump body is changed so that the hook 48 has swung around to the extent that it is engaged with bar 54. This avoids any possibility of the dump body falling too far to the rear and falling off the truck bed. When the dumping is completed retraction of the piston rod lowers the dump body and disengages the hook 48 from bar 54 so that the piston rod may be retracted from the cone 50, thereby leaving the dump body entirely free from connection to the bed except for the hinge 34 at the rear. Then by merely pulling pins 40 from the hinge the dump body can be elevated from the truck bed by means of fluid cylinders 32, the legs 14 and 16 can be extended downwardly into contact with the ground and locked into place with the pins 24 and 26, the fluid cylinders 32 can then be retracted and the truck driven out from under the dump body leaving it sitting as shown in FIGURE 1.

It will therefore be apparent that the present invention provides a dump truck wherein the dumping cylinder is always in proper position to engage the dump body to raise the body to a dumping position and yet when the dumping cylinder is retracted it is not engaged with the dump body so that the dump body may readily be elevated from the bed of the truck and the truck removed therefrom without having to disengage the dumping cylinder from the body.

Many different types of bodies may be handled by the same truck, so that a contractor, for example, who has need for a dump truck, a stake body truck, and an enclosed van truck, needs to purchase only one truck with three different bodies, and needs to hire only one driver, to perform all his hauling jobs.

Although a specific embodiment of the invention has been shown and described herein many modifications thereof will be apparent to those skilled in the art and therefore the invention is not limited to the embodiment described but only as defined by the following claims.

We claim:

1. Apparatus comprising in combination, a truck bed, a dump body removably mounted on said truck bed, a plurality of retractable, ground-engaging supports on said dump body, cooperating means on said truck bed and said dump body adapted to raise and lower said dump body with respect to said truck bed, a fluid cylinder pivotally mounted on said truck bed, a piston rod extensible rearwardly and upwardly therefrom, a conical end on said piston rod, a female cone pivotally attached to said dump body and having its open face normally directed toward the end of the piston rod, a slot in the apex of the female cone, a hook extending axially from said piston rod, and a bar positioned above said female cone extending laterally from said dump body in a position to be engaged by said hook upon dumping movement of said dump body and consequent pivoting of said fluid cylinder and said female cone.

2. Apparatus as defined by claim 1, including means releasably retaining said female cone in position to be engaged by the conical piston rod end.

3. Apparatus as defined by claim 2 wherein the female cone retaining means is a magnet.

4. Apparatus comprising in combination, a truck bed, a demountable truck body mounted thereon, cooperable means on said truck bed and said dump body for demounting said dump body from said truck bed, a fluid cylinder mounted on said truck bed, a piston rod in said fluid cylinder, and a female cone pivotally mounted on said dump body with the open portion of said cone toward the piston rod.

5. Apparatus as defined by claim 4, and including means releasably retaining said female cone in position to be engaged by said piston rod.

6. Apparatus comprising, in combination, a truck bed, a demountable dump body mounted thereon, cooperable means on said truck bed and said dump body for demounting said dump body from said truck bed, a fluid cylinder pivotally mounted on said truck bed, a piston rod in said fluid cylinder extending rearwardly and upwardly therefrom, cooperating male and female engagement means on said piston rod and said dump body positioned to engage each other upon extension of said piston rod from said fluid cylinder, and retaining means on said dump body releasably retaining the engagement means on the dump body in position to be engaged by the engagement means on the piston rod.

7. Apparatus as defined by claim 6 wherein the retaining means comprises a magnet.

8. Apparatus as defined by claim 6 and including a hook extending axially from the end of the piston rod, a slot in the engagement means on the dump body positioned and sized for passage therethrough of said hook, and means adjacent the engagement means on the dump body positioned to be engaged by said hook upon movement of said dump body to a dumping position to limit the movement of the dump body.

References Cited in the file of this patent
UNITED STATES PATENTS

| | | |
|---|---|---|
| 1,425,965 | Hocke | Aug. 15, 1922 |
| 2,027,421 | Eisenberg | Jan. 14, 1936 |
| 2,251,839 | Dondlinger | Aug. 5, 1941 |
| 2,517,304 | Greening | Aug. 1, 1950 |
| 2,539,086 | Kirksey | Jan. 23, 1951 |
| 2,708,047 | Seidle | May 10, 1955 |